United States Patent [19]

Lehr

[11] Patent Number: 5,747,657
[45] Date of Patent: May 5, 1998

[54] REACTIVE MONOAZO DYESTUFFS AND THE PROCESSES IN WHICH THEY ARE PRODUCED

[75] Inventor: Friedrich Lehr, Efringen Kirchen, Germany

[73] Assignee: Clariant Finance (BVI) Limited, Tortola, Virgin Islands (Br.)

[21] Appl. No.: 765,786

[22] PCT Filed: Jul. 14, 1995

[86] PCT No.: PCT/EP95/02779

§ 371 Date: Jan. 14, 1997

§ 102(e) Date: Jan. 14, 1997

[87] PCT Pub. No.: WO96/02593

PCT Pub. Date: Feb. 1, 1996

[30] Foreign Application Priority Data

Jul. 16, 1994 [DE] Germany ............ 44 25 222.6
Oct. 4, 1994 [DE] Germany ............ 44 35 380.4

[51] Int. Cl.⁶ .................. C09B 62/51; D06P 1/38
[52] U.S. Cl. ........................... 534/635; 534/638
[58] Field of Search ..................... 534/635, 638

[56] References Cited

FOREIGN PATENT DOCUMENTS

| | | |
|---|---|---|
| 345577 | 12/1989 | European Pat. Off. . |
| 414068 | 2/1991 | European Pat. Off. . |
| 432542 | 6/1991 | European Pat. Off. . |
| 567036 | 10/1993 | European Pat. Off. . |
| 2239024 | 6/1991 | United Kingdom . |

*Primary Examiner*—Fiona T. Powers
*Attorney, Agent, or Firm*—Scott E. Hanf; Gabriel Lopez

[57] ABSTRACT

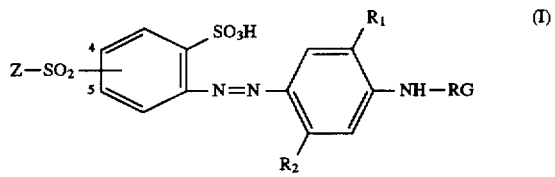

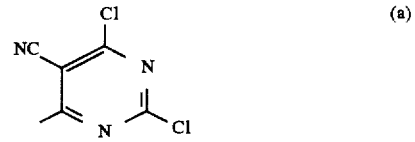

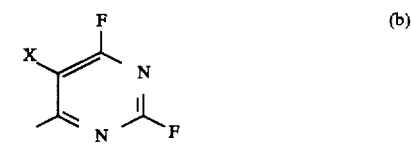

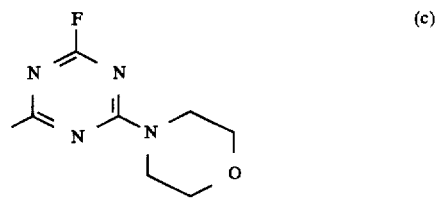

The invention relates to reactive-group-containing monoazo dyestuffs of formula (I), their salts or mixtures thereof, wherein $R_1$ signifies hydrogen, methyl, methoxy or ethoxy, $R_2$ signifies hydrogen, methyl, $NHCONH_2$ or $NHCOCH_3$, RG signifies (a), (b) or (c), X signifies hydrogen or chlorine, Z signify a group $-CH=CH_2$, $-CH_2CH_2W$ or mixtures thereof wherein W is a leaving group removable by alkali and $-SO_2-Z$ may be bonded in a meta- or para-position with respect to the azo group. These compounds are useful as reactive dyestuffs in printing or dyeing hydroxy-group-containing or nitrogen-containing organic substrates.

16 Claims, No Drawings

REACTIVE MONOAZO DYESTUFFS AND THE PROCESSES IN WHICH THEY ARE PRODUCED

This application is a 371 of PCT/EP95/02779 filed Jul. 14, 1995.

The objects of the invention are monoazo dyestuffs which contain reactive groups, processes for their production and their use as reactive dyes in dyeing and printing processes.

The invention relates to dyestuffs of formula I

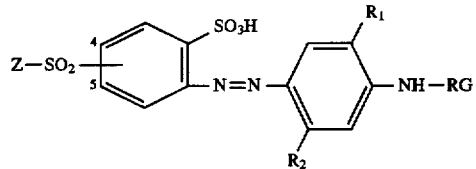

their salts or mixtures thereof,
wherein $R_1$ signifies hydrogen, methyl, methoxy or ethoxy
$R_2$ signifies hydrogen, methyl, $NHCONH_2$ or $NHCOCH_3$,
RG signifies

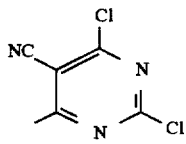
FIG. (i)

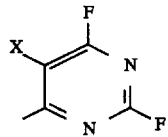
FIG. (ii)

or

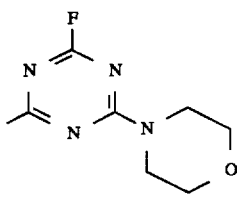
FIG. (iii)

X signifies hydrogen or chlorine, Z signifies a group —CH=$CH_2$, —$CH_2CH_2$W or mixtures thereof wherein W is a leaving group removable by alkali and —$SO_2$—Z may be bonded in a meta- position with respect to the azo group when RG is of formula (i) and —$SO_2$—Z may be bonded in a meta- or para-position with respect to the azo group when RG is of formula (ii) or formula (iii).

$R_1$ preferably signifies hydrogen, $R_2$ preferably signifies $NHCONH_2$ or $NHCOCH_3$, W, preferably is a leaving group such that upon removal of W-H by alkali a group —CH=$CH_2$ remains and is more preferably a sulphuric acid ester, a thiosulphuric acid ester, a phosophoric acid ester, an acetic acid ester or a halogen, e.g., bromine, chlorine or iodine, most prerferably the sulphuric acid ester group —$OSO_2OH$ and —$SO_2$—Z is preferably bonded at a meta position, more preferably the 5-position to the azo group.

The most preferred dyestuffs according to the invention are according to the formula

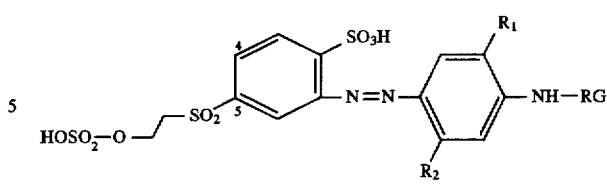

and their salts, wherein RG represents

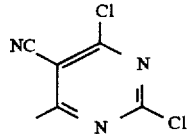

$R_1$ is hydrogen, $R_2$ is $NHCONH_2$ or $NHCOCH_3$ and the reactive sulphonic acid radical, —$SO_2$—$(CH_2)_2$—O—$SO_2$-OH, is in the 5- position or RG represents

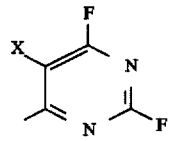

$R_1$ is hydrogen, $R_2$ is $NHCONH_2$ or $NHCOCH_3$, X is defined as above and the reactive sulphonic acid radical, —$SO_2$—$(CH_2)_2$—O—$SO_2$—OH, is in the 5- position or RG represents

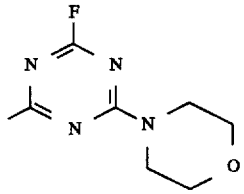

$R_1$ is hydrogen, $R_2$ is $NHCONH_2$ and the reactive sulphonic acid radical, —$SO_2$—$(CH_2)_2$—O—$SO_2$—OH, is in the 5-position.

The invention provides in another of its aspects a process for the production of dyestuffs of formula I, their salts or mixtures thereof, which comprises the step of reacting a compound of formula II

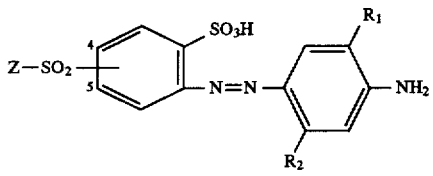

with a compound selected from

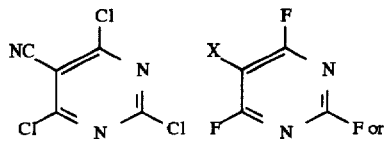

-continued

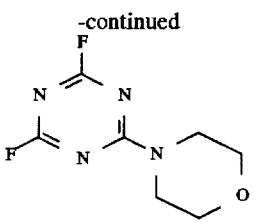

The process is preferably carried out at a temperature of from 10° to 80° C., preferably 20° to 60° C. and at a pH of from 4 to 7. Advantageously, the process is carried out in an aqueous medium.

In an alternative process according to the invention dyestuffs of formula I, their salts or mixtures thereof, wherein RG represents

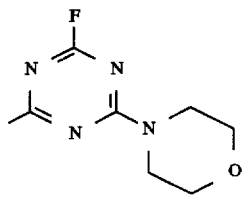

are prepared by reacting a compound of formula II

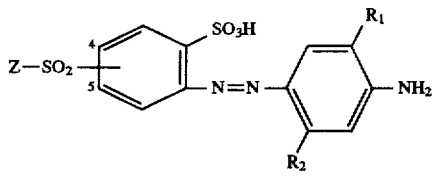

with Cyanuric fluoride and thereafter reacting the reaction product with morpholine. The process is advantageously carried out in an aqueous medium. The reaction of a compound II with cyanuric fluoride is carried out at a temperature of between 0° and 5° C. with a slight excess of cyanuric fluoride. The resultant product is reacted with a slight excess of morpholine at a temperature of between 0° to 20° C.

The compounds of formula II are conveniently obtained, when a compound of formula IV

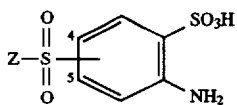

is diazotised and coupled with a coupling component of formula V

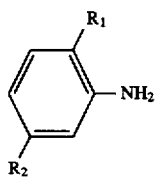

The diazotisation reaction is carried out according to a conventional synthesis and is preferably carried out at a temperature of between 0° to 10° C., more preferably 0° to 5° C. and at a pH of from 0 to 2. The coupling reaction is likewise conventional and may be preferably carried out at a temperature of 5° to 25° C. and at a pH of from 0.5 to 4.

The starting materials of formulae IV and V are conventional and readily available or easily prepared from commonly available reagents using conventional syntheses.

In a preferred process according to the invention the group Z is represented by the formula —$CH_2CH_2$—O—$SO_2$—OH.

Dyestuffs of formula I may be isolated from the reaction mixture according to known methods, for example, the dyestuffs may be separated from the reaction mixture by means of conventional salting out with alkali metal salts, filtered off and dried, optionally in vacuo, at a slightly elevated temperature. Depending upon the reaction and isolation conditions, a dyestuff of formula I is obtained as a free acid or in its salt form or as a mixed salt form. The dyestuff of formula (I) may be converted from the free-acid to the salt form and vice versa using techniques known in the art.

In the case that the dyestuffs are in their salt form, the cation associated with any sulphonate group may be any non-chromophoric cation which is conventional in the chemistry of reactive dyestuffs, provided that the corresponding salt is water soluble.

Examples of suitable cations are alkali metal ions or unsubstituted or substituted ammonium ions, for example lithium, sodium, potassium, ammonium, mono-, di-, tri- and tetramethylammonium, triethylammonium and mono-, di- and tri-ethanolammonium.

Preferred cations are the alkali metal ions and the ammonium ion, of which sodium and potassium are particularly preferred.

The dyestuffs of formula (I), their salts or mixtures thereof are useful as fibre-reactive dyestuffs and are suitable for dyeing and printing hydroxy group-containing or nitrogen-containing organic substrates.

Accordingly, the invention provides in another of its aspects the use of dyestuffs of the formula (I), their salts or mixtures thereof in dyeing or printing hydroxy group-containing or nitrogen-containing organic substrates.

Various types of material may be employed as substrates, for example, silk, leather, wool, polyamide fibres and polyurethanes, and in particular cellulose-containing fibre materials of all kinds. Such fibre materials are, for example, natural cellulosic fibres, such as cotton, linen and hemp, as well as wood pulp and regenerated cellulose. The dyestuffs of formula (I) are also suitable for dyeing or printing hydroxyl-group-containing fibres, which are contained in mixed fabrics, for example, mixtures of cotton with polyester fibres or polyamide fibres.

In another aspect of the invention there is provided a substrate as hereinabove defined dyed or printed with dyestuffs according to the formula (I), their salts or with mixtures thereof.

The invention further provides a process of dyeing or printing substrates as hereinabove described with dyestuffs of the formula (I), their salts or mixtures thereof.

The dyestuffs according to the invention may be applied to the fibre material and fixed onto the fibres in various ways, especially in the form of aqueous dyestuff solutions and printing pastes. They are especially suitable for the exhaust process, but also for dyeing by the padding process, wherein the goods are impregnated with aqueous, optionally salt-containing, dyestuff solutions, and the dyestuffs are fixed after an alkali treatment or in the presence of an alkali, optionally with heat action. Furthermore, they are suitable for the so-called cold dwell process, wherein the dyestuff is applied to a padder, together with an alkali. After fixing, the dyeings or prints are rinsed thoroughly with cold and hot water, optionally adding an agent which has dispersant action and promotes diffusion of the unfixed parts.

The dyestuffs of formula (I) an their salts are notable for their high reactivity and very good fixation value (typically over 85%). They may therefore be employed in the exhaust dyeing process at low dyeing temperatures, e.g., 30° to 80° C., more preferably 40° to 60° C. and at a goods to liquour ratio of 1:6 to 1:20, more preferably 1:10 and in the pad-steam and liquor process require only short steam times. The fixing rates are high, and the unfixed parts can be readily washed out, which provides that the difference between the exhaust rate and the fixing rate is remarkably small, that is, the soap loss is very slight. The dyestuffs of formula (I) are also suitable for printing, in particular on to cotton substrates, but also for printing nitrogen-containing fibres for example wool, silk or wool-containing mixed fabrics.

Dyestuffs according to the formula (I) and their salts display good compatibility with known fibre-reactive dyestuffs. Accordingly, dyestuffs of formula (I), their salts and mixtures thereof may be used alone in a dyeing or printing process or as a component of a dyeing or printing composition comprising other fibre-reactive dyestuffs of the same class, that is, reactive dyestuffs which possess comparable dyeing properties, for example, fastness properties and the ability to exhaust from a dyebath onto a suitable substrate. In particular, the dyestuffs of the invention may be employed in a trichromatic dyebath in conjunction with certain other dyestuffs having suitable chromophores and the same or other suitable reactive group or groups, the proportion of a particular dyestuff in such a composition being dictated by the particular shade which is to be produced.

The dyeings and prints produced with the dyestuffs according to the invention are notable for their clear shades. In particular, on cellulosic fibre materials, the dyeings and prints have a very deep colour and high stability of dyestuff binding to the fibres, both in an acidic and an alkaline range, and furthermore good light fastness and very good wet fastness properties, such as to washing, water, sea water, over- dyeing and perspiration, as well as good fastness to pleating, ironing and rubbing.

The following examples serve to illustrate the invention. In the examples, the parts are expressed by weight if not otherwise stated, and the temperatures are given in degrees celsius.

EXAMPLE 1

1A) Production of 1-aminobenzene-5-β-sulphatoethylsulphone-2-sulphonic acid 98.5 parts of 1-aminobenzene-3-β-sulphatoethylsulphone were added in portions at 60° C., over the course of 30 minutes, to 125 parts of sulphuric acid (100%, chemically pure) in a 500 ml sulphonation flask equipped with a KPG stirrer, thermometer, dropping funnel; and a reflux condenser fitted with drying tube. Thereafter, over the course of 5 minutes, 85 parts of oleum with a SO₃ content of 65–66%, were added dropwise to the brown-black, very viscous solution, whereupon the temperature increased to ca. 90° C. The mixture was then heated to 160° C. and stirred at this temperature for 4 hours. Thereafter, the reaction mixture was allowed to cool to 60° C., and the reaction mixture poured onto 630 parts of ice. The pH of the reaction mixture was adjusted to 4.5–5 by adding in portions a total of ca. 250 parts of soda. The precipitated solids were filtered off, and the filtrate mixed with a mixture of 740 parts of methanol and 9620 parts of acetone. The precipitated beige product was filtered off and dried in a vacuum-drying chamber at 40° C. 105.5 parts of 1-aminobenzene-5-β-sulphatoethylsulphone-2-sulphonic acid were obtained, with a nitrite titre of ca. 60%.

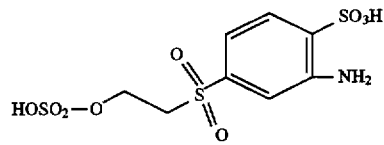

1b) Coupling with m-aminophenyl-urea 36.2 parts of 1-aminobenzene-5-β-sulphatoethylsulphone-2-sulphonic acid (60%) from 1a) were dissolved in 175 parts of water in a 1 l beaker at room temperature. 15 parts of concentrated hydrochloric acid were added and cooling was effected to 0°–5° C. by means of external cooling with ice/water and by adding 200 parts of ice, before adding a total of 15 parts of a 4N sodium nitrite solution dropwise at this temperature over the course of 30 minutes. Afterwards, stirring was effected for ca. 1 hour at 0°–5° C., and any excess nitrite was broken down by adding ca. 1.5 parts of 1N amidosulphonic acid.

The brown diazonium salt solution obtained was then pumped over the course of 20–30 minutes into a suspension of 9.1 parts of m-aminophenyl- urea in 90 parts of water, the pH value of which had been adjusted to 5, and which had been cooled to 5° C. by means of external cooling. The pH value of 5 was kept constant during this period by simultaneously adding 20% soda solution. Heating was effected to room temperature and stirring was effected over night. The dark orange dyestuff solution obtained was mixed with stirring, at room temperature, with 200 parts of sodium chloride, and adjusted to pH 3 by adding 10 parts of 10% hydrochloric acid. 87.7 parts of dyestuff of the following formula were precipitated, then filtered off and further processed whilst moist.

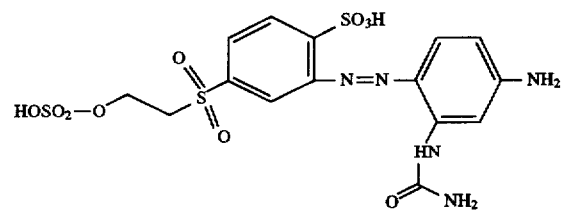

1c) Condensation with 5-chloro-2,4,6-trifluoro-pyrimidine 60 parts of the moist dyestuff from 1b) were dissolved in 700 parts of water at room temperature and at pH of 6.5. One drop of a wetting agent (Sandozin NIL) was added, and then, over the course of one hour, a total of 11.8 parts of 5-chloro-2,4,6-trifluoro-pyrimidine were added in portions at room temperature and a pH value of 6.5 was maintained by simultaneously adding 20% soda solution. Stirring was effected for 2 hours at room temperature and at pH 6.5, 4 parts of a filtering assistant were added, to the reaction mixture before filtering. The filtrate was mixed with 160 parts of sodium chloride and the precipitated product was filtered off and dried in a vacuum at 50° C., to yield 26.9 parts of dyestuff of the following formula:

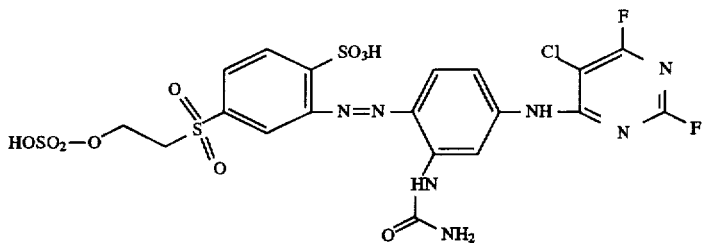

λ_max (H$_2$O) was measured at 378 nm. The dyestuff dyed cotton to a golden yellow shade with outstandingly high fixing values. The dyeings had good fastness and especially good washability.

EXAMPLES 2–16

Examples 2 to 16 were produced according to a method analogous described in Example 1, using corresponding starting materials to yield dyestuffs of the formula of which is given below.

TABLE 1

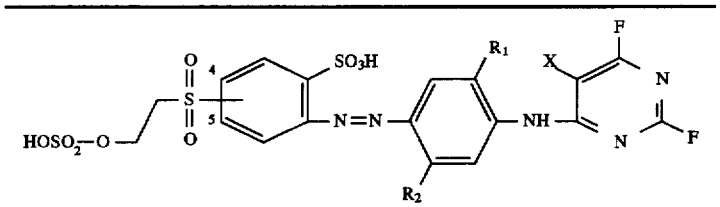

| No. | position HO$_3$SO−C$_2$H$_4$−SO$_2$ | R$_1$ | R$_2$ | X | λmax (H$_2$O) [nm] |
|---|---|---|---|---|---|
| 2 | 4 | H | −NHCONH$_2$ | Cl | 418 |
| 3 | 4 | H | −NHCOCH$_3$ | Cl | 388 |
| 4 | 5 | H | −NHCOCH$_3$ | Cl | 382 |
| 5 | 4 | H | −NHCONH$_2$ | H | 436 |
| 6 | 4 | H | −NHCOCH$_3$ | H | 402 |
| 7 | 5 | H | −NHCONH$_2$ | H | 412 |
| 8 | 5 | H | −NHCOCH$_3$ | H | 392 |
| 9 | 5 | H | −CH$_3$ | H | 382 |
| 10 | 5 | H | −CH$_3$ | Cl | 372 |
| 11 | 4 | −OCH$_3$ | −CH$_3$ | H | 403 |
| 12 | 4 | −OCH$_3$ | −CH$_3$ | Cl | 389 |
| 13 | 4 | H | −CH$_3$ | H | 391 |
| 14 | 4 | H | −CH$_3$ | Cl | 377 |
| 15 | 5 | −OCH$_3$ | −CH$_3$ | H | 394. |
| 16 | 5 | −OCH$_3$ | −CH$_3$ | Cl | 383 |

The dyestuffs of Examples 2 to 16 dyed cotton in yellow to orange shades with remarkably high fixing values. The dyeings had good fastness (e.g. washability, washing fastness, light fastness).

In accordance with the above-described methods, the dyestuffs of Examples 1 to 16 were obtained as sodium salts. Depending on the chosen reaction and isolation conditions, or even by taking subsequent measures, they may be produced in known manner in the form of the free acid or in another salt form or also mixed salt form, in which case they contain for example one of the cations listed in the description.

EXAMPLE 17

17a) Production of 1-aminobenzene-5-β-sulphatoethylsulphone-2-sulphonic acid 1-aminobenzene-5-β-sulphatoethylsulphone-2-sulphonic acid was prepared according to the process described in Example 1a.

17b) Coupling with m-aminophenyl-urea

The coupling reaction was carried out according to the process described in Example 1b.

17c) Condensation with 5-cyano-2,4,6-trichloro-pyrimidine 43.8 parts of the moist dyestuff from 17b) were dissolved in 400 parts of water at room temperature and at a pH of 6.5. One drop of a wetting agent (Sandozin NIL) was added, and over the course of 30 minutes, a solution of 7.5 parts of 5-cyano-2,4,6-trichloro-pyrimidine in 75 parts of acetone was added dropwise at room temperature and a pH value of 6.5 was maintained by simultaneously adding 20% soda solution. Stirring was effected for 2 hours at 40° C. and at a pH of 6.5, 4 parts of a filtering assistant were added, and the reaction mixture filtered. The filtrate was mixed with 80 parts of sodium chloride and stirred over night before the precipitated product is filtered off and dried in a vacuum at 50° C. to yield ca. 12 parts of dyestuff of the following formula:

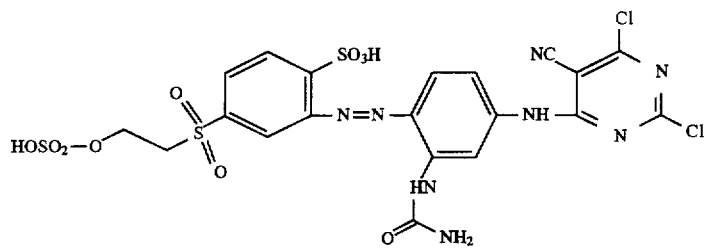

$\lambda_{max}$ (H$_2$O) was measured at 380 nm. The dyestuff dyed cotton to a golden yellow shade with outstandingly high fixing values. The dyeings had good fastness, especially good washing fastness.

EXAMPLES 18–22

Examples 18 to 22 were produced according to a method analogous to that described in Example 17 using corresponding starting materials. They are listed in the following Table 2, the relevant formula of which is given below.

23b) Coupling with m-aminophenyl urea

The title compound was prepared in accordance with the method described in Example 1b.

23c) Condensation reaction with cyanofluoride and morpholine 77 parts of the moist dyestuff obtained according to Example 23b (titre=22.8% determined via a titanium III-titration) were dissolved in 325 parts of water at a pH of 6.3, one drop of a wetting agent (Sandozin NIL) was added and

TABLE 2

| No. | R$_1$ | R$_2$ | λmax (H$_2$O) [nm] |
|---|---|---|---|
| 18 | —H | —NHCOCH$_3$ | 378 |
| 19 | —OCH$_3$ | —NHCOCH$_3$ | 390 |
| 20 | —H | —CH$_3$ | 370 |
| 21 | —OCH$_3$ | —CH$_3$ | 382 |
| 22 | —OC$_2$H$_5$ | —CH$_3$ | 392 |

The dyestuffs of Examples 18 to 22 dyed cotton to yellow to orange shades with remarkably high fixing values. The dyeings had good fastness (e.g. washability, washing fastness, light fastness).

In accordance with the above-described methods, the dyestuffs of Examples 17 to 22 were obtained as sodium salts. Depending on the chosen reaction and isolation conditions, or even by taking subsequent measures, they were produced in known manner in the form of the free acid or in another salt form or also mixed salt form, in which case they contained for example, one of the cations listed in the description.

EXAMPLE 23

23.a) Production of 1-aminobenzene-5-⊖-sulphatoethylsulphone-2-sulphonic acid

The title compound was prepared in accordance with the method of Example 1a.

the resultant solution was cooled to 0° C. in an ice-acetone bath. To this solution were added 6.7 parts of 2,4,6-trifluoro-1,3,5-triazine (cyanuric fluoride) at 0° C. with stirring. The pH of this solution was maintained at 5.8 by dropwise addition of 17.5 parts of a 20% soda solution. After 30 minutes at 0° C. a mixture at pH 5 consisting of 3.6 parts of morpholine, 5 parts of water and approximately 10 parts of 30% hydrochloric acid was added to the solution. The solution was stirred for a further 45 minutes at 0° C. and a pH 5.4 and a further 30 minutes at room temperature whilst maintaining the pH at 5.8 with the total dropwise addition of approximately 13.5 parts of a 20% soda solution. The pH of the solution was adjusted to 5.0 by adding 0.5 part of 30% hydrochloric acid. 100 parts of potassium chloride were added and the precipitated dyestuff was filtered and dried in a vacuum at 50° C. 38.8 parts of the dyestuff were obtained having the formula

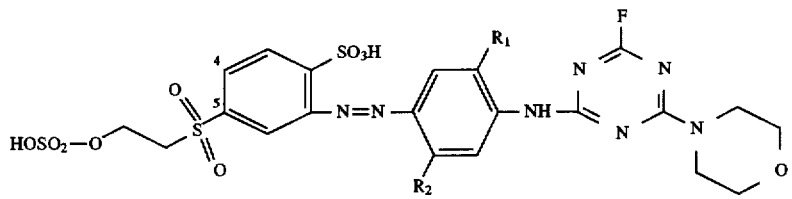

$\lambda_{max}$ (H$_2$O) was measured at 398 nm. The dyestuff dyed cotton to a golden yellow shade with high fixing values. The dyeings had good fastness, especially good fastness in the presence of detergents containing oxidising agents.

EXAMPLES 24–32

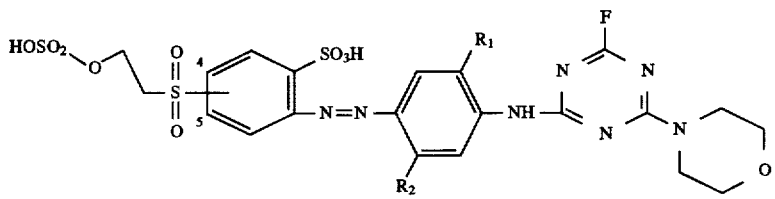

Dyestuffs according to the above formula were formed according to a method described in Example 23 using appropriate starting materials.

TALE 3

| Example | Position HOSO$_3$—(CH$_2$)$_2$SO$_2$— | R$^1$ | R$^2$ | $\lambda_{MAX}$ (nm) (H$_2$O) |
|---|---|---|---|---|
| 24 | 5 | —H | —NHCOCH$_3$ | 378 |
| 25 | 5 | —H | —CH$_3$ | 368 |
| 26 | 5 | —OCH$_3$ | —CH$_3$ | 390 |
| 27 | 5 | —OCH$_3$ | —NHCOCH$_3$ | 405 |
| 28 | 4 | —H | —NHCONH$_2$ | 404 |
| 29 | 4 | —H | —NHCOCH$_3$ | 384 |
| 30 | 4 | —H | —CH$_3$ | 374 |
| 31 | 4 | —OCH$_3$ | —CH$_3$ | 396 |
| 32 | 4 | —OCH$_3$ | —NHCOCH$_3$ | 412 |

APPLICATION EXAMPLE A 10 parts of bleached cotton tricot were placed in a dye bath at 50° C., containing a solution of 0.13 parts of the dyestuff of Example 1 and 8 parts of calcined sodium sulphate in 100 parts of dimineralised water. After 25 minutes at 50° C., a total of 0.4 part of calcined sodium carbonate was added at intervals of 10 minutes, comprising 0.06, 0.12 and 0.22 part and the temperature held at 50° C. for a further 5 minutes. The mixture was heated to 60° C. over the course of 15 minutes, and dyeing was allowed to continue for one hour at 60° C. The dyed material was subsequently rinsed for 2 minutes under hot running demineralised water (60° C.±10° C.), then for 2 minutes under hot running tap water (50° C.±10° C.). The dyeing was washed at the boil for 20 minutes in 500 parts of demineralised water (without additives). Thereafter the material was rinsed once more as follows:

2 minutes under hot running demineralised water (60° C.±10° C.)

2 minutes under hot running tap water (50° C.±10° C.)

2 minutes under cold running tap water (15° C.±5° C.), then centrifuged and dried in an electronically controlled tumble-drier.

A golden-yellow cotton dyeing with good fastness was obtained. The dyeing had especially good light and wet fastness and was stable towards oxidative influences and had very good fixing values.

APPLICATION EXAMPLE B 10 parts of cotton tricot (bleached) were placed in a dye bath at 50° C., containing a solution of 0.13 parts of the dyestuff of Example 1 and 8 parts of calcined sodium sulphate in 100 parts of demineralised water. After 25 minutes at 50° C., a total of 0.5 part of calcined sodium carbonate and 0.3 parts of 32% NaOH solution are added at intervals of 10 minutes, comprising 0.08, 0.16 and 0.26 part of sodium carbonate and 0.05, 0.1 and 0.15 part of 32% NaOH solution, whereupon the temperature was held at 50° C. for a further 5 minutes. The mixture was heated to 60° C. over the course of 15 minutes, and dyeing was allowed to continue for one hour at 60° C. The dyed material was subsequently rinsed for 2 minutes under hot running demineralised water at 60° C.±10° C., then for 2 minutes under hot running tap water at 50° C.±10° C. The dyeing was washed at the boil for 20 minutes in 500 parts of demineralised water (without additives). Afterwards, the material was rinsed once more as follows:

2 minutes under hot running demineralised water (60° C.±10° C.)

2 minutes under hot running tap water (50° C.±10° C.)

2 minutes under cold running tap water (15° C.±50° C.), then centrifuged and dried in an electronically controlled tumble-drier.

After rinsing and drying, a golden-yellow cotton dyeing was obtained which possessed the properties given for the dyeing produced according to Example A. The dyestuffs of the remaining Examples, or dyestuff mixtures thereof, were also used for dyeing in an analogous manner to that described in application Examples A and B. The dyeings obtained possessed good fastness properties and very good fixing values.

APPLICATION EXAMPLE C

A printing paste having the components
40 parts of the dyestuff of Example 1
100 parts of urea 350 parts of water 500 parts of a 4% sodium alginate thickener 10 parts of sodium bicarbonate 1000 parts in all was applied to cotton material by a conventional printing process.

The printed material was steamed for 4–8 minutes at 102°–104° and then given a cold and a hot rinse. The fixed cotton material was subsequently washed at the boil in a process analogous to that described in Example A and dried. The golden-yellow print obtained had good all-round fastness.

The dyestuffs of the remaining Examples or dyestuff mixtures of Examples 1–32 may also be used for printing cotton analogously to application Example C. In all cases, prints with good fastness properties and very good fixing values were obtained.

I claim:

1. A dyestuff according to the formula (I)

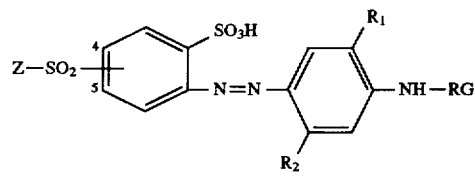

or a salt or a mixture thereof, wherein $R_1$ signifies hydrogen, methyl, methoxy or ethoxy $R_2$ signifies hydrogen, methyl, NHCONH$_2$ or NHCOCH$_3$ RG signifies

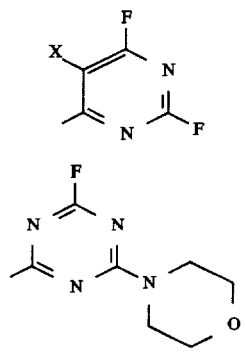

formula (ii)

formula (iii)

X signifies hydrogen, Z signifies a group —CH=CH$_2$, —CH$_2$CH$_2$W or mixtures thereof wherein W is a leaving group removable by alkali, and —SO$_2$—Z may be bonded in a meta- or para- position with respect to the azo group when RG is of formula (ii) or formula (iii).

2. A dyestuff according to claim 1 having the formula

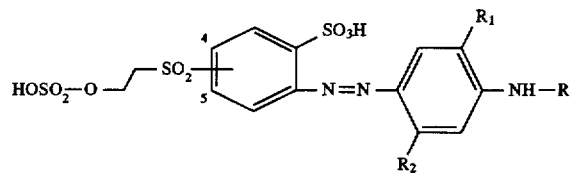

or a salt or mixture thereof, wherein, $R_1$ signifies hydrogen, methyl, methoxy or ethoxy $R_2$ signifies hydrogen, methyl, NHCONH$_2$ or NHCOCH$_3$ RG signifies formula (i)

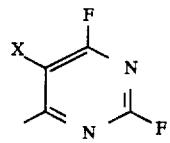

formula (ii)

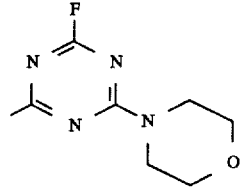

formula (iii)

X signifies hydrogen, and the reactive sulphonic acid radical, —SO$_2$—(CH$_2$)$_2$—O—SO$_2$—OH, may be bonded in a meta- or para- position with respect to the azo group when RG is of formula (ii) or formula (iii).

3. A dyestuff according to claim 1 or claim 2 or a salt thereof, wherein $R_1$ signifies hydrogen.

4. A dyestuff according to claims 1 or 2 or a salt thereof, wherein $R_2$ signifies NHCONH$_2$ or NHCOCH$_3$.

5. A dyestuff according to claims 1 or 2 or a salt thereof, wherein —SO$_2$—Z is bonded in a meta- position to the azo group.

6. A dyestuff according to claims 1 or 2 or a salt thereof, wherein —SO$_2$—Z is bonded in the 5- position.

7. A dyestuff according to any of the claims 1 or 2 according to the formula

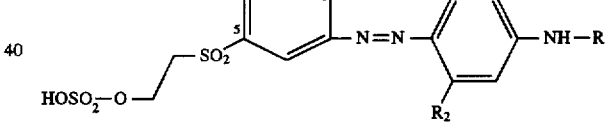

or a salt thereof wherein RG represents

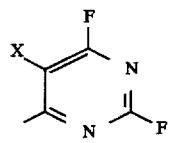

$R_1$ is hydrogen, $R_2$ is NHCONH$_2$ or NHCOCH$_3$, X is hydrogen and the reactive sulphonic acid radical, —SO$_2$—(CH$_2$)$_2$—O—SO$_2$—OH, is in the 5- position.

8. A dyestuff according to any of the claims 1 or 2 having the formula

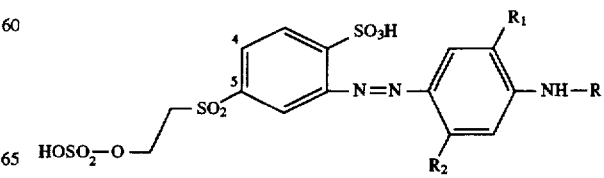

or a salt thereof, wherein RG represents

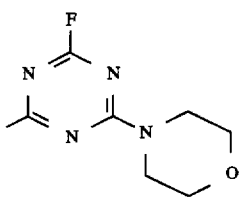

R$_1$ is hydrogen, R$_2$ is NHCONH$_2$ and the active sulphonic acid radical, —SO$_2$—(CH$_2$)$_2$—O—SO$_2$—OH, is in the 5- position.

9. A dyestuff according to claims 1 or 2 having the formula

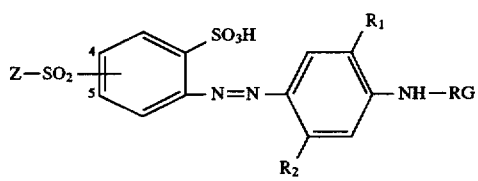

or a salt or mixture thereof, wherein,

R$_1$ signifies hydrogen, methyl, methoxy or ethoxy
R$_2$ signifies hydrogen, methyl, NHCONH$_2$ or NHCOCH$_3$
RG signifies

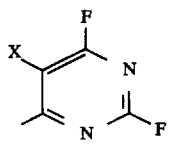

formula (ii)

X signifies hydrogen

Z signifies a group —CH=CH$_2$, —CH$_2$CH$_2$W or mixtures thereof wherein W is a leaving group removable by alkali, and —SO$_2$—Z is bonded in the 4- or 5- position.

10. Process for the production of a compound of formula I, comprising the step of reacting a compound of formula II

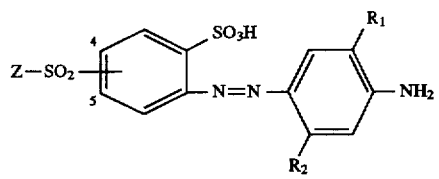

with a compound selected from

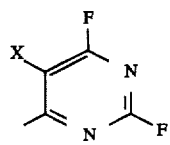

formula (ii)

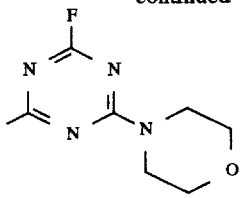

formula (iii)

wherein

R$_1$ signifies hydrogen, methyl, methoxy or ethoxy
R$_2$ signifies hydrogen, methyl, NHCONH, or NHCOCH3
X signifies hydrogen. Z signifies a group —CH=CH$_2$, —CH$_2$CH$_2$W or mixtures thereof wherein W is a leaving group removable by alkali, and —SO$_2$—Z may be bonded in a meta- or para- position with respect to the azo group when RG is of formula (ii? or formula (iii).

11. A process according to claim 10 wherein Z represents the group —CH$_2$CH$_2$—O—SO$_2$OH.

12. A process for the production of a compound of formula I

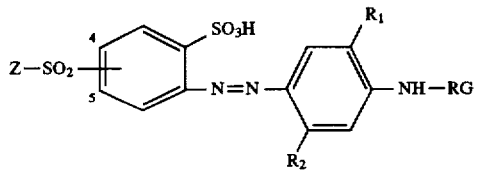

or a salt or mixture thereof,
wherein
R$_1$ signifies hydrogen, methyl, methoxy or ethoxy
R$_2$ signifies hydrogen, methyl, NHCONH$_2$ or NHCOCH$_3$
RG signifies

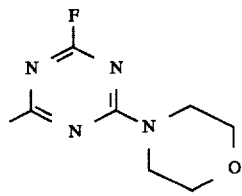

comprising:
reacting a compound of the formula

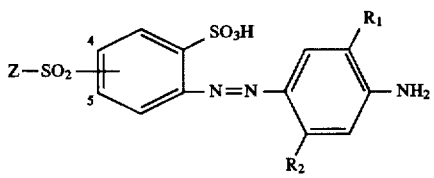

wherein
R$_1$ signifies hydrogen, methyl, methoxy or ethoxy
R$_2$ signifies hydrogen, methyl, NHCONH$_2$ or NHCOCH$_3$
Z signifies a group —CH=CH$_2$, —CH$_2$CH$_2$W or mixtures thereof wherein W is a leaving group removable by alkali, and —SO$_2$—Z may be bonded in a meta- or para- position with respect to the azo group with Cyanuric fluoride and thereafter reacting the reaction product with morpholine.

13. A process of dyeing or printing hydroxy-group-containing or nitrogen-containing substrates with dyestuffs according to the formula of claim 1 or a salt or mixture thereof.

14. A process according to claim 13 of dyeing or printing leather or fibre materials which consist of or contain natural or regenerated cotton.

15. A process according to claim 13 or claim 14 of dyeing or printing textile material which consists of or contains cotton.

16. A hydroxy-group-containing or nitrogen-containing substrate dyed or printed with a dyestuff of any of claims 1 or 2, or a salt or mixture thereof.

* * * * *